United States Patent [19]

Sutton

[11] 3,788,657
[45] Jan. 29, 1974

[54] TOOL HOLDER FOR USE WITH AUTOMATIC TOOL CHANGING APPARATUS

[75] Inventor: Robert S. Sutton, Franklin, Mich.
[73] Assignee: Ex-Cell-O Corporation, Detroit, Mich.
[22] Filed: Aug. 30, 1972
[21] Appl. No.: 284,812

[52] U.S. Cl............. 279/1 TS, 279/1 A, 279/1 ME
[51] Int. Cl............................................ B23b 31/36
[58] Field of Search................ 279/1 TS, 1 ME, 1 A

[56] References Cited
UNITED STATES PATENTS
3,327,386 6/1967 Jerue................................. 279/1 TS
1,984,839 12/1934 Murray.............................. 279/1 TS

*Primary Examiner*—Leonidas Vlachos
*Attorney, Agent, or Firm*—James H. Bower, Mitchell J. Hill

[57] ABSTRACT

A tool holder for use with a machine tool having a rotatable spindle and an automatic tool changing apparatus for positioning the tool holder in alignment with the spindle and for engagement therewith for performing a work operation on a workpiece by a tool carried in the tool holder. The tool holder includes a holder body having a shank adapted to be received in the drive spindle of a machine tool, and a radially outward extended peripheral flange. The flange is provided with a pair of elongated, radially inward extended pockets which are identically shaped and disposed on opposite sides of the flange. The elongated pockets are adapted to operatively receive complementary shaped fingers of the tool gripping mechanism of an automatic tool changer apparatus. A pair of inserts having selectively spaced apart bores are adapted to be mounted in the elongated pockets to permit locating and securing the tool holder in a predetermined orientation in the tool gripping mechanism of the automatic tool changing apparatus.

7 Claims, 7 Drawing Figures

PATENTED JAN 29 1974　　　　　　　　　　　　　　　3,788,657
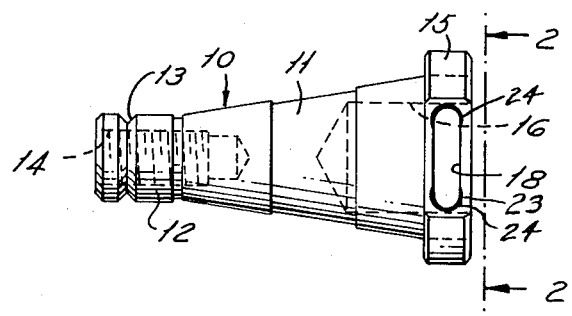
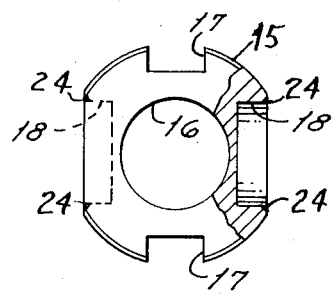 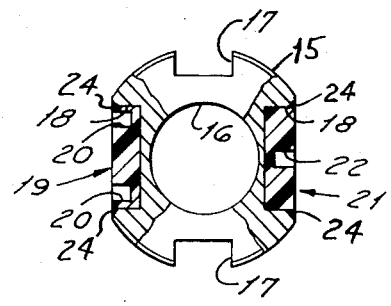
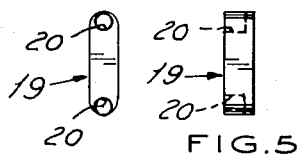 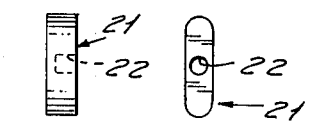

3,788,657

TOOL HOLDER FOR USE WITH AUTOMATIC TOOL CHANGING APPARATUS

BACKGROUND OF THE INVENTION

At the present time, there are various types of machine tools available on the market which are constructed and arranged to automatically perform a series of sequentially programmed cutting operations on a workpiece. The tools which are required for such cutting operations are disposed in suitable storage apparatuses, as for example, a tool storage conveyor. An automatic tool changing apparatus is provided for selectively transferring cutting tools from the tool storage conveyor to the machine tool rotatable spindle. One of the problems encountered in the transfer of tools between the tool storage conveyor and the machine tool rotatable spindle is the misorientation of tool holders. For example, the automatic tool changing apparatus disclosed in U.S. Pat. No. 3,449,823 requires a tool or tool holder of the type shown in U.S. Pat. No. 3,327,386. The last mentioned tool holder is provided with two pin holes on one side thereof and one pin hole on the other side thereof. The pin holes in the tool holder are adapted to receive complementary shaped fingers of the tool gripping mechanism disclosed in the first mentioned patent. The tool holder shown in said U.S. Pat. No. 3,327,386, is provided with a pair of drive key slots for positioning the tool holder in the rotatable spindle of a machine tool. However, there are two possibilities of positioning the tool holder in a machine tool rotatable spindle. The two pin holes can end up as being disposed in an "up" position or in a "down" position. If the two pin holes are disposed in a "down" position, the tool gripping mechanism secures the tools properly. If, however, a tool holder has been placed in the tool storage conveyor, or in a machine spindle, with the two pin holes 180° out of phase, the tool gripping mechanism does not pick up the tool holder since the fingers on the tool gripping mechanism cannot seat in the proper pin holes.

SUMMARY OF THE INVENTION

This invention relates to the tool holder art, and more particularly, to an improved tool holder which overcomes the problem of tool holder misorientation in a tool storage conveyor.

The tool holder of the present invention is provided with a tapered shank carrying a flange provided with a pair of elongated pockets which replace the pin holes of the tool holder disclosed in U.S. Pat. No. 3,327,386. The overall length dimensions of the pockets are the same as the dimension between the outer sides of the pin holes in the tool holder of said last named patent. That is, the tool holder of the present invention is located by the outside edges of the fingers on a tool gripping mechanism. Because both pockets are identical, the orientation of the improved tool holder in a tool storage conveyor or spindle, makes no difference. Replacing the pin holes of the prior art tool holder with the elongated pockets completely eliminates the possibility of an operator putting a tool holder in a machine tool storage conveyor with the wrong orientation.

There are many tools that do not require any orientation. However, when a particular orientation of a tool and the tool holder carrying the same is mandatory, then a tool holder of the present invention is provided with plastic inserts that are disposed in the elongated pockets and which are provided with pin holes to provide the desired pin-orientation function to the tool holder.

Other features and advantages of this invention will be apparent from the following detailed description, appended claims, and the accompanying drawing.

BRIEF DESCRIPTION OF THE DRAWING

FIG. 1 is a side elevation view of a tool holder made in accordance with the principles of the present invention.

FIG. 2 is a front end elevation view, partly in section, of the tool holder illustrated in FIG. 1, taken along the line 2—2 thereof, and looking in the direction of the arrows.

FIG. 3 is a front end elevation view, similar to FIG. 2, of the tool holder of FIG. 1, and showing the tool holder provided with pin-orientation inserts.

FIG. 4 is a front elevation view of a two pin-orientation insert.

FIG. 5 is a right side elevation view of the insert structure illustrated in FIG. 4.

FIG. 6 is a front elevation view of a one pin-orientation insert.

FIG. 7 is a left side elevation view of the insert structure of FIG. 6.

DESCRIPTION OF THE PREFERRED EMBODIMENT

Referring now in detail to the drawing, and in particular to FIG. 1, the numeral 10 generally indicates the body of a tool holder made in accordance with the principles of the present invention. The tool holder body 10 comprises a tapered shank 11 which is provided on its rear end with an integrally formed cylindrical portion 12. The tool holder body 10 is provided on its rear end with an inwardly extended, axially disposed threaded bore 14 for the reception of a conventional machine tool spindle draw bar for securing the tool holder in the rotatable spindle of a machine tool. The cylindrical portion 12 of the tool holder body 10 is provided with a peripheral locating groove 13 for locating the tool holder axially in a machine tool spindle. The tool body 10 with its tapered shank 11 and cylindrical portion 12 are of a standard construction.

Integrally formed on the front end of the tool holder body 10 is a radially outward extended peripheral flange or collar 15. As best seen in FIG. 1, the tool holder body 10 is provided in the front end thereof with an axial, inwardly extended holder socket 16.

As best seen in FIG. 2, the flange 15 is provided with a pair of drive key slots or notches 17 on diametrically opposite sides thereof. The slots 17 are open to the circular periphery of the flange 15. The drive key slots 17 are adapted to be drivingly engaged by conventional engaging fingers or drive keys on a machine tool rotatable spindle.

As best seen in FIG. 2, the periphery of the flange 15 is also provided with a pair of diametrically opposite flats 23, in each of which is formed an elongated insert recess or pocket 18. The pockets 18 are identical in shape and they are disposed in axial alignment with each other. The pockets 18 are also disposed evenly between the drive key slots 17. The pockets 18 are adapted to receive the tool gripping fingers of an automatic tool changing apparatus as, for example, the automatic tool changing apparatus illustrated in the aforementioned U.S. Pat. No. 3,449,823. The automatic tool changing apparatus disclosed in the last named patent is provided with a pair of arms for gripping a tool holder, with one arm having a pair of spaced apart tool holder gripping pins and the other arm a single tool holder gripping pin. The slots 18 are each formed to a dimension equal to the overall length dimension between the outer end sides of the two pins on an arm of a tool gripping mechanism, whereby the tool holder of the present invention may be operatively engaged by the tool changing mechanism disclosed in said last mentioned patent with the pins operatively engaging either one of the pockets 18, without any misorientation of the tool holder. The tool holder of the present invention may be used with cutting tools which do not require any particular orientation relative to a workpiece during a cutting operation. As shown in FIGS. 1, 2 and 3, the pockets 18 are provided with chamfers 24 around the semicircular ends thereof to assist the insertion of the pins on the tool gripper arms into the pockets 18. The pockets 18 have parallel side walls which extend circumferentially around the flange 15, and they also have semi-circular end walls.

FIGS. 4 through 6 illustrate a pair of pin-orientation inserts which may be operatively mounted in the elongated pockets 18 to provide the tool holder with orientation pin holes for coaction with locating pins on the arms of an automatic tool gripper mechanism. FIG. 4 illustrates a two pin insert, generally indicated by the numeral 19. The insert 19 is an elongated solid body which is provided with parallel side surfaces and semi-circular end walls. A pin hole or bore 20 is formed at each end of the insert 19.

The overall shape of the insert 19 is identical to the shape of the elongated pockets 18, and of a size whereby it may be slidably mounted into one of the pockets 18. The pin holes or bores 20 are in alignment with each other, and they are parallel to each other.

FIGS. 6 and 7 illustrate a second pin-orientation insert, generally indicated by the numeral 21. The shape of the insert 21 is identical to the shape of the insert 19. The insert 21 is provided with a single, centrally located pin hole or bore 22, which is parallel to the bores 20 in the insert 19 when the inserts 19 and 21 are mounted in the pair of pockets 18. In the last mentioned condition, the pin bore 22 is centrally disposed relative to the bores 20.

The inserts 19 and 21 may be made from any suitable material such as a plastic material.

The tool holder illustrated in FIGS. 1 and 2 may be used without the inserts 19 and 21 in instances where the cutting tool held in the tool holder does not have to be orientated relative to the workpiece in any particular manner. In such a case, the tool holder gripping pins on the arms of a tool gripping mechanism of the type shown in U.S. Pat. No. 3,449,823, are adapted to operatively engage the pockets 18. A tool gripping arm with two pins thereon would engage the semi-circular end surfaces of one of the pockets 18 and this would provide sufficient gripping engagement with the tool holder to permit it to be interchanged between a tool storage conveyor and the rotatable spindle of a machine tool. The single pin on the other tool gripping arm of the tool gripping mechanism would enter the other socket 18 and would permit the tool gripping mechanism to operate in its usual manner. However, in instances where it is mandatory that a cutting tool be provided with a particular orientation, then the tool holder of FIGS. 1 and 2 is provided with the inserts 19 and 21, whereby the tool holder may be positioned in the tool storage conveyor with the two pin holes in the insert 19 disposed downwardly so that the tool gripping mechanism properly secures the tool and transfers it as desired.

While it will be apparent that the preferred embodiment of the invention herein disclosed is well calculated to fulfill the objects above stated, it will be appreciated that the invention is susceptible to modification, variation and change.

What is claimed is:

1. A tool holder comprising:
  a. a holder body having a shank adapted to be received in the drive spindle of a machine tool;
  b. a radially outward extended peripheral flange on said holder body;
  c. said flange being provided with elongated, radially inward extended pocket means disposed on opposite sides of said flange and arranged to receive the fingers of a tool gripping mechanism;
  d. said flange being further provided with a spindle drive key slot means between said elongated pocket means to receive mating drive key means on a machine tool drive spindle; and
  e. insert means operatively mounted in said elongated pocket means and having radially inward extended recess means adapted to receive the fingers of a tool gripping mechanism.

2. A tool holder as defined in claim 1, wherein:
  a. said elongated pocket means comprises a pair of elongated pockets which each has spaced, circumferentially extended, parallel side walls and semi-circular end walls.

3. A tool holder as defined in claim 2, including:
  a. said insert means operatively mounted in said elongated pockets comprises a pair of elongated inserts, each of which has parallel side surfaces and semi-circular end surfaces; and,
  b. each of said elongated inserts being provided with radially inward extended recess means to receive the fingers of a tool gripping mechanism.

4. A tool holder as defined in claim 3, wherein:
  a. said pair of elongated pockets are identically shaped and said pair of elongated inserts are identically shaped.

5. A tool holder as defined in claim 3, wherein:
  a. the recess means in one of said elongated inserts comprises a pair of circumferentially spaced apart, radially inward extended, bores for the reception of a pair of complementary fingers of a tool gripping mechanism, and the recess means in the other of said elongated inserts is provided with one radially inward extended bore for the reception of one complementary finger of a tool gripping mechanism.

6. A tool holder as defined in claim 5, wherein:
  a. said pair of bores in said one elongated insert are disposed parallel to and on opposite sides of the said bore in said other elongated insert.

7. A tool holder as defined in claim 6, wherein:
  a. said flange is provided with a pair of diametrically opposite flat surfaces on the outer periphery thereof adjacent said elongated pockets and engagable with said tool gripping mechanism.

* * * * *